United States Patent
Du et al.

(10) Patent No.: US 9,524,560 B2
(45) Date of Patent: Dec. 20, 2016

(54) IMAGE EDGE DETECTION METHOD AND APPARATUS THEREOF, IMAGE TARGET IDENTIFICATION METHOD AND APPARATUS THEREOF

(71) Applicants: BOE TECHNOLOGY GROUP CO., LTD., Beijing (CN); K-TRONICS (SU ZHOU) TECHNOLOGY CO., LTD., Wujiang District, Suzhou, Jiangsu Province (CN)

(72) Inventors: Namei Du, Beijing (CN); Min Chen, Beijing (CN)

(73) Assignees: BOE TECHNOLOGY GROUP CO., LTD., Beijing (CN); K-TRONICS (SU ZHOU) TECHNOLOGY CO., LTD., Suzhou, Jiangsu Province (CN)

( * ) Notice: Subject to any disclaimer, the term of this patent is extended or adjusted under 35 U.S.C. 154(b) by 13 days.

(21) Appl. No.: 14/654,155

(22) PCT Filed: Sep. 30, 2014

(86) PCT No.: PCT/CN2014/087925
§ 371 (c)(1),
(2) Date: Jun. 19, 2015

(87) PCT Pub. No.: WO2015/196616
PCT Pub. Date: Dec. 30, 2015

(65) Prior Publication Data
US 2016/0267675 A1    Sep. 15, 2016

(30) Foreign Application Priority Data
Jun. 23, 2014  (CN) .......................... 2014 1 0282974

(51) Int. Cl.
*G06K 9/00* (2006.01)
*G06T 7/00* (2006.01)
(Continued)

(52) U.S. Cl.
CPC ........... *G06T 7/0085* (2013.01); *G06K 9/4604* (2013.01); *G06T 2207/10004* (2013.01); *G06T 2207/20* (2013.01)

(58) Field of Classification Search
CPC .................................... G06K 9/00; G06T 7/00
(Continued)

(56) References Cited

U.S. PATENT DOCUMENTS

| 8,131,477 | B2 * | 3/2012 | Li | ......................... G06T 7/0012 382/282 |
| 8,670,622 | B2 * | 3/2014 | Kono | .................... G06T 7/0085 382/199 |

FOREIGN PATENT DOCUMENTS

| CN | 101841642 A | 9/2010 |
| CN | 101859385 A | 10/2010 |

(Continued)

OTHER PUBLICATIONS

First Chinese Office Action regarding Application No. 2014102829743 dated May 16, 2016. Translation provided by Dragon Intellectual Property Law Firm.
(Continued)

*Primary Examiner* — Abolfazl Tabatabai
(74) *Attorney, Agent, or Firm* — Harness, Dickey & Pierce, P.L.C.

(57) ABSTRACT

The edge detection method according to an embodiment of the present disclosure may include: convolving pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed; calculating gradient magnitudes of the pixels to be processed, based on the brightness differential approximations in the respective predetermined
(Continued)

directions for the pixels to be processed; comparing the gradient magnitudes of the pixels to be processed with a gradient magnitude threshold, and selecting the pixels to be processed whose gradient magnitudes are larger than or equal to the gradient magnitude threshold as edge pixels; and extracting a contour of a target within an image, based on the resultant edge pixels.

20 Claims, 6 Drawing Sheets

(51) Int. Cl.
*G06K 9/46* (2006.01)
*H04N 5/225* (2006.01)

(58) Field of Classification Search
USPC ........ 382/103, 107, 236; 348/169, 170, 171, 348/172, 352
See application file for complete search history.

(56) References Cited

FOREIGN PATENT DOCUMENTS

| CN | 101944233 A | 1/2011 |
|---|---|---|
| CN | 102324045 A | 1/2012 |
| CN | 102426699 A | 4/2012 |
| CN | 103716511 A | 4/2014 |

OTHER PUBLICATIONS

Real-Time Moving Object Detection and Tracking Based on Improved Mean Shift; Journal of Central South University (Science and Technology), vol. 42 Suppl. 1, Sep. 2011.
Recognition of Airplanes Using Multi-feature Fusion; J. Huazhong Univ. of Sci. & Tech. (Natural Science Edition), vol. 37 No. 1, Jan. 2009.
Software Design of the Embedded System for Underwater Targets Recognition; A dissertation for Degree of M. Eng.; Harbin Engineering University, Mar. 2013.
A Novel Approach of Edge Detection Based on Gray Correlation degree and Prewitt Operator; Shi Jun-tao, Zhu, Ying; Chu, Xiao-li, Ren, Ya-heng.
Edge Detection Based on Log_Prewitt Operator; Song, Pei-Hua, Lu, Zong-Qi, Gao, Dun-yue; College of Information, East China University of Science and Technology, Shanghai 200237, China.
Written Op9nion of the International Searching Authority for International Application No. PCT/CN2014/087925.
Image Enhancement Based on Piecewise Linear Transformation; Zhang Jun-Hua, Yang, Gen, Xu, Qing; Information Engineering University, Zhengzhou 450002.

\* cited by examiner (a) (b) (c)

(a) (b) (c)

(a) (b) (c)

(a)          (b)          (c)

IMAGE EDGE DETECTION METHOD AND APPARATUS THEREOF, IMAGE TARGET IDENTIFICATION METHOD AND APPARATUS THEREOF

CROSS-REFERENCE TO RELATED APPLICATION

This application is the U.S. national phase of PCT Application No. PCT/CN2014/087925 filed on Sep. 30, 2014, which claims priority to Chinese Patent Application No. 201410282974.3 filed on Jun. 23, 2014, the disclosures of which are incorporated in their entirety by reference herein.

TECHNICAL FIELD

The present disclosure relates to the field of image processing technology, in particular to an image edge detection method and an apparatus thereof as well as an image target identification method and an apparatus thereof.

BACKGROUND

Edge detection is one of most fundamental issues in the field of image processing and computerized visualization. The object of edge detection is to identify points whose brightness varies significantly in an image. However, with respect to those images having a non-uniform and uneven illumination thereon, for example an underwater glimmer image taken by a glimmer camera in an underwater environment, due to poor imaging conditions, a conventional edge detection method can hardly remove interference caused by background noises.

SUMMARY

Embodiments of the present disclosure provide an image edge detection method and an apparatus thereof as well as an image target identification method and an apparatus thereof, which can improve anti-interference of image edge detection method.

To achieve the above object, the following technical solutions are used in embodiments of the present disclosure.

In an aspect, the present disclosure provides an image edge detection method, which may include: convolving pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed; calculating gradient magnitudes of the pixels to be processed, based on the brightness differential approximations in the respective predetermined directions for the pixels to be processed; comparing the gradient magnitudes of the pixels to be processed with a gradient magnitude threshold, and selecting the pixels to be processed whose gradient magnitudes are larger than or equal to the gradient magnitude threshold as edge pixels; and extracting a contour of a target within an image, based on the resultant edge pixels.

Alternatively, the edge detection operators may be Prewitt operators.

Alternatively, the templates in respective predetermined directions for edge detection operators may include templates in horizontal direction and templates in vertical direction, and equations for calculating brightness differential approximations in horizontal and vertical directions for the pixels to be processed may be as follow:

$$A = (\log(F(x+1,y-1)) + \log(F(x+1,y)) + \log(F(x+1,y+1))) - (\log(F(x-1,y-1)) + \log(F(x-1,y)) + \log(F(x-1,y+1)))$$

$$B = (\log(F(x-1,y+1)) + \log(F(x,y+1)) + \log(F(x+1,y+1))) - (\log(F(x-1,y-1)) + \log(F(x,y-1)) + \log(F(x+1,y-1)))$$

where $F(x,y)$ represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

Alternatively, an equation for calculating gradient magnitudes of the pixels to be processed may be as follow: $G(x,y) = |A| + |B|$, where $G(x, y)$ represents gradient magnitudes of the pixels to be processed.

Alternatively, before the convolving step, the method may further include: conducting a piecewise linear conversion and a logarithm conversion on grayscale values for respective pixels in the image sequentially, so as to obtain enhanced grayscale values for respective pixels in the image; wherein an equation for conducting the piecewise linear conversion may be as follow:

$$g(x, y) = \begin{cases} F(x, y)/2 + 40, & F(x, y) \in [0, 80) \\ (F(x, y) - 64)/2 + 50, & F(x, y) \in [80, 192) \\ F(x, y)/2 + 180, & F(x, y) \in [192, 256) \end{cases}$$

and
an equation for conducting the logarithm conversion may be as follow:

$$g'(x,y) = \lg(g(x,y)+1)/(\lg 256) * 256$$

where $F(x,y)$ represents grayscale values for respective pixels in the image before the piecewise linear conversion, $g(x,y)$ represents grayscale values for respective pixels in the image after the piecewise linear conversion, and $g'(x,y)$ represents grayscale values for respective pixels in the image after the logarithm conversion.

In another aspect of the present disclosure, an image target identification method is provided, which may include: an image edge detection step, which is implemented by any one of the above image edge detection methods.

Alternatively, the above method may further include: a target restoration step, which may include: obtaining a chain code table of contour regions of a target by using a contour tracing method; calculating perimeters of respective regions in the image based on the chain code table; selecting regions whose perimeters are larger than or equal to a predetermined threshold as edges of the target in the image, and retaining the chain code table of the target; converting the retained chain code table into a segment table in the vertical direction; and judging whether or not a distance between two ends in the segment table is smaller than or equal to a sum of distances among a predetermined number of pixels, and filling out a region between the two ends, when the distance between the two ends in the segment table is smaller than or equal to the sum of distances among the predetermined number of pixels, so as to obtain the restored target.

Alternatively, when the image is an underwater glimmer image, the method may further include a target identification step, which may include: calculating a shape factor of the target by $F=L^2/4\pi S$, where F represents the shape factor of the target, L represents the perimeter of contour regions of the target, S represents an area of contour regions of the target, and the area of contour regions of the target is calculated based on the segment table; determining the target as a spherical target, in the condition that the shape factor of the target is close to 1; determining the target as an ellipsoidal target, in the condition that the shape factor of the target is about 1.5; determining the target as a tripodal target, in the condition that the shape factor of the target is larger than or equal to about 1.8.

In another aspect of the present disclosure, an image edge detection apparatus is provided, which may include: a convolving unit, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed; a gradient magnitude calculating unit, which is configured to calculate gradient magnitudes of the pixels to be processed, based on the brightness differential approximations in the respective predetermined directions for the pixels to be processed; a comparing unit, which is configured to compare the gradient magnitudes of the pixels to be processed with a gradient magnitude threshold, and select the pixels to be processed whose gradient magnitudes are larger than or equal to the gradient magnitude threshold as edge pixels; and a contour extracting unit, which is configured to extract a contour of a target within an image, based on the resultant edge pixels.

Alternatively, the edge detection operators may be Prewitt operators.

Alternatively, the templates in respective predetermined directions for edge detection operators may include templates in horizontal direction and templates in vertical direction, and equations for calculating brightness differential approximations in horizontal and vertical directions for the pixels to be processed by the convolving unit may be as follow:

$A=(\log(F(x+1,y-1))+\log(F(x+1,y))+\log(F(x+1,y+1)))-(\log(F(x-1,y-1))+\log(F(x-1,y))+\log(F(x-1,y+1)))$ $B=(\log(F(x-1,y+1))+\log(F(x,y+1))+\log(F(x+1,y+1)))-(\log(F(x-1,y-1))+\log(F(x,y-1))+\log(F(x+1,y-1)))$ where F(x,y) represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

Alternatively, an equation for calculating gradient magnitudes of the pixels to be processed by the gradient magnitude calculating unit may be as follow: $G(x,y)=|A|+|B|$ where G(x,y) represents gradient magnitudes of the pixels to be processed.

Alternatively, the above apparatus may further include: a unit, which is configured to conduct a piecewise linear conversion and a logarithm conversion on grayscale values for respective pixels in the image sequentially, so as to obtain enhanced grayscale values for respective pixels in the image; wherein an equation for conducting the piecewise linear conversion may be as follow:

$$g(x,y) = \begin{cases} F(x,y)/2 + 40, & F(x,y) \in [0, 80) \\ (F(x,y)-64)/2 + 50, & F(x,y) \in [80, 192) \\ F(x,y)/2 + 180, & F(x,y) \in [192, 256) \end{cases}$$

and
an equation for conducting the logarithm conversion may be as follow:

$g'(x,y)=\lg(g(x,y)+1)/(\lg 256)*256$ where F(x,y) represents grayscale values for respective pixels in the image before the piecewise linear conversion, g(x,y) represents grayscale values for respective pixels in the image after the piecewise linear conversion, and g'(x,y) represents grayscale values for respective pixels in the image after the logarithm conversion.

In another aspect of the present disclosure, an image target identification apparatus is provided, which may include: an edge detection module, which includes: a convolving unit, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed; a gradient magnitude calculating unit, which is configured to calculate gradient magnitudes of the pixels to be processed, based on the brightness differential approximations in the respective predetermined directions for the pixels to be processed; a comparing unit, which is configured to compare the gradient magnitudes of the pixels to be processed with a gradient magnitude threshold, and select the pixels to be processed whose gradient magnitudes are larger than or equal to the gradient magnitude threshold as edge pixels; and a contour extracting unit, which is configured to extract a contour of a target within an image, based on the resultant edge pixels.

Alternatively, the apparatus may further include: a target restoration module, which includes: a chain code table obtaining unit, which is configured to obtain a chain code table of contour regions of a target by using a contour tracing method; a perimeter calculating unit, which is configured to calculate perimeters of respective regions in the image based on the chain code table; a filtering unit, which is configured to select regions whose perimeters are larger than or equal to a predetermined threshold as edges of the target in the image, and retain the chain code table of the target; a converting unit, which is configured to convert the retained chain code table into a segment table in the vertical direction; and a filling unit, which is configured to judge whether or not a distance between two ends in the segment table is smaller than or equal to a sum of distances among a predetermined number of pixels, and fill out a region between the two ends, when the distance between the two ends in the segment table is smaller than or equal to the sum of distances among the predetermined number of pixels, so as to obtain the restored target.

Alternatively, the apparatus may further include a target identification module, which includes: a shape factor calculating unit, which is configured to calculate a shape factor of the target by $F=L^2/4\pi S$, where F represents the shape factor of the target, L represents the perimeter of contour regions of the target, S represents an area of contour regions of the target, and the area of contour regions of the target is calculated based on the segment table; and a determining unit, which is configured to determine the target as a spherical target, in the condition that the shape factor of the target is close to 1; determine the target as an ellipsoidal target, in the condition that the shape factor of the target is about 1.5; and determine the target as a tripodal target, in the condition that the shape factor of the target is larger than or equal to about 1.8.

The advantageous effects provided by above technical solutions include: when image edge detection is carried out, disparity between grayscale values of noise pixels and background pixels can be reduced, by conducting a logarithm of grayscale values of respective pixels adjacent to the pixels to be processed. Thereby noise pixels can be removed effectively, and the problem that the conventional edge detection method is over-sensitive to non-uniform and uneven illumination can be overcome. As a result, the ability of anti-interference can be improved.

DETAILED DESCRIPTION

Firstly, a principle of the image edge detection method according to an embodiment of the present disclosure will be explained.

In the course of imaging an image, an intensity of incident light is set to be i(x,y), a reflective ratio on an object surface is set to be r(x,y), and an intensity (grayscale value) of a respective pixel after imaging is set to be g(x,y), then a relationship among the above three is as follow:

$$g(x,y)=i(x,y)r(x,y)$$

or $$\text{Log}(g(x,y))=\log(i(x,y))+\log(r(x,y))$$

where, i(x,y) is a slow variable, which reflects external condition characteristics, while r(x,y) is a fast variable, which reflects object self-imaging characteristics. Edge pixels and noise pixels in the image can be identified, after a logarithm of grayscale values of pixels, which reduces the disparity between pixels whose grayscale values are similar (noise pixels and background pixels in the image).

However, for those images that have a poor imaging condition or a non-uniform and uneven illumination, in addition to a target itself in the image, there might be other noise interferences. Thereby it is too challenging to determine a suitable grayscale value threshold so as to remove noise pixels, when edge detection is conducted.

In order to solve the above problem, in the present disclosure, when image edge detection is carried out, disparity between noise pixels and background pixels can be reduced, by conducting a logarithm of grayscale values of respective pixels adjacent to the pixels to be processed. Thereby noise pixels can be removed effectively. This method is also referred to as an edge detection method based on optical density.

In order to make the objects, the technical solutions and the advantages of the present disclosure to be more apparent, the present disclosure will be described hereinafter in a clear and complete manner in conjunction with the drawings and embodiments.

Figure 1:
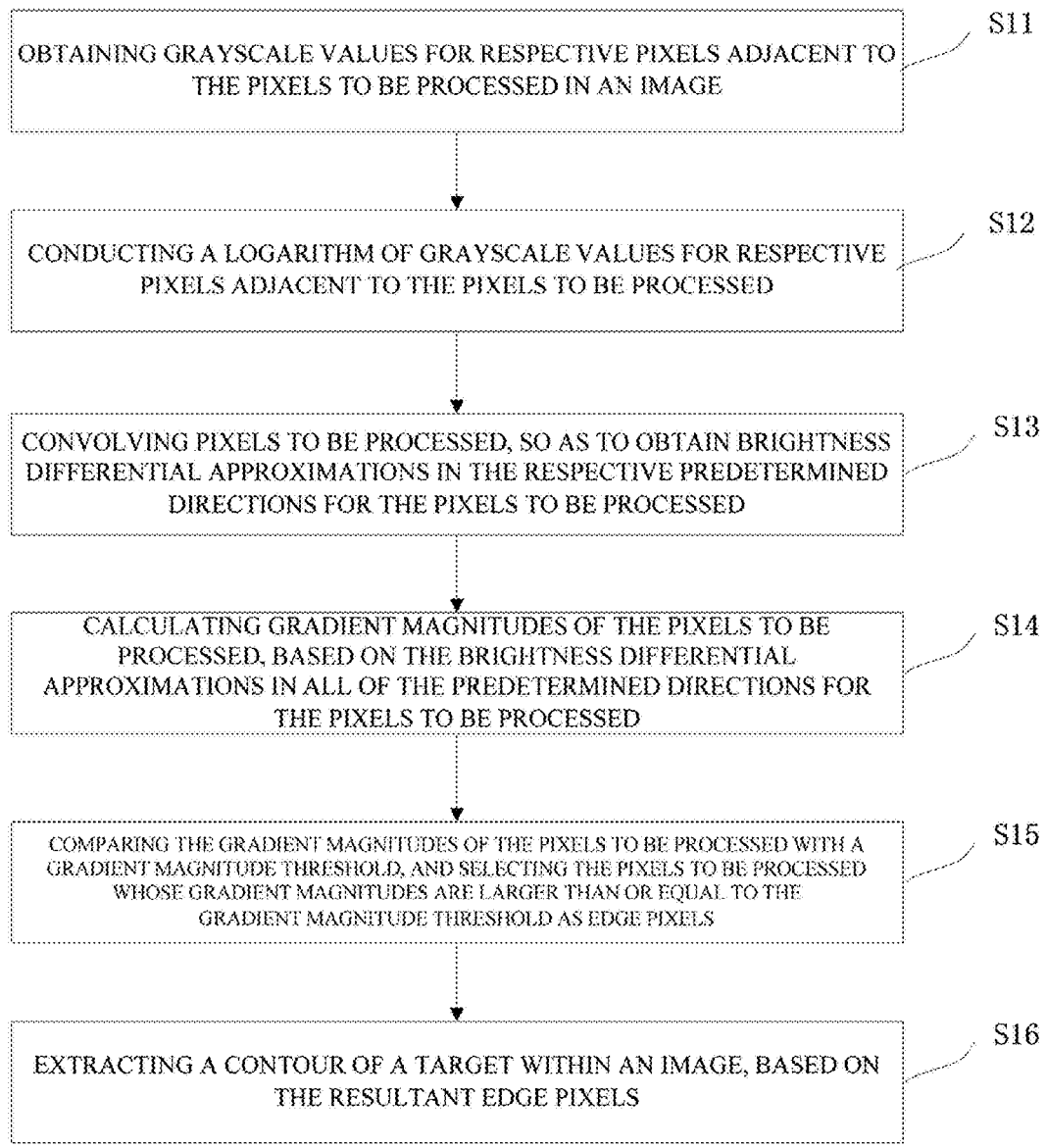
FIG. 1 is a flow chart of an image edge detection method according to an embodiment of the present disclosure.

Referring to FIG. 1, which is a flow chart of an image edge detection method according to an embodiment of the present disclosure. Specifically, this edge detection method includes:

Step S11, obtaining grayscale values for respective pixels adjacent to the pixels to be processed in an image.

Specifically, the respective pixels adjacent to the pixels to be processed are determined based on edge detection operators.

For example, different kinds of edge detection operators, such as Prewitt operators, Sobel operators, and so forth, may be selected according to characteristics of the image.

Step S12, conducting a logarithm of grayscale values for respective pixels adjacent to the pixels to be processed.

Here, log(F(x,y)) represents a logarithm operation, and F(x,y) represents a grayscale value of the pixel (x,y).

Step S13, convolving pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed.

Figures 2, 3:
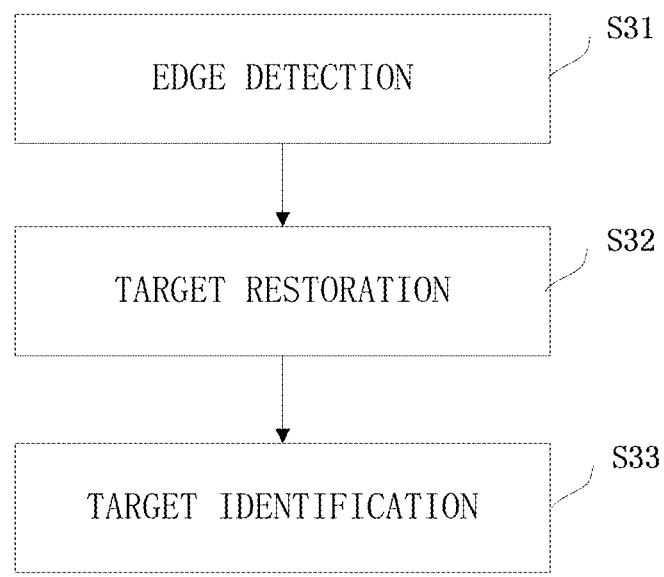
FIG. 2 is a schematic view showing templates of Prewitt operators according to an embodiment of the present disclosure.
FIG. 3 is a flow chart of an image target identification method according to an embodiment of the present disclosure.

Referring to FIG. 2, which is a schematic view showing templates of Prewitt operators according to an embodiment of the present disclosure. Prewitt operators according to an embodiment of the present disclosure include a template in a horizontal direction and a template in a vertical direction. Here, (x) represents the template in the horizontal direction that is used to detect horizontal edges in the image, while (y) represents the template in the vertical direction that is used to detect vertical edges in the image.

However, in other embodiments of the present disclosure, other Prewitt operators of templates in more directions might be adopted for the purpose of edge detection. For example, in addition to templates in the horizontal direction and in the vertical direction, Prewitt operators may include templates in other directions, such as 45 degree, 135 degree and so forth.

Specifically, the above step for convolving pixels to be processed may be as follow:

Firstly, multiplying resultant grayscale values after the logarithm of grayscale values of respective pixels adjacent to the pixels (x,y) to be processed by certain coefficients in the corresponding positions in the template.

Next, adding up all products obtained by the above multiplying, so as to obtain brightness differential approximations in the corresponding directions in the template for the pixels to be processed.

Taking Prewitt operators shown in FIG. 2 as an example, equations for calculating brightness differential approximations in the horizontal and vertical directions for the pixels to be processed are as follow:

$$A=(\log(F(x+1,y-1))+\log(F(x+1,y))+\log(F(x+1,y+1)))-(\log(F(x-1,y-1))+\log(F(x-1,y))+\log(F(x-1,y+1)))$$

$$B=(\log(F(x-1,y+1))+\log(F(x,y+1))+\log(F(x+1,y+1)))-(\log(F(x-1,y-1))+\log(F(x,y-1))+\log(F(x+1,y-1)))$$

where F(x,y) represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

Step S14, calculating gradient magnitudes of the pixels to be processed, based on the brightness differential approximations in all predetermined directions for the pixels to be processed.

Still taking Prewitt operators shown in FIG. 2 as an example, an equation for calculating gradient magnitudes of the pixels to be processed is as follow:

$$G(x,y)=|A|+|B|$$

where G(x,y) represents gradient magnitudes of the pixels to be processed, A represents brightness differential approximations in the vertical direction for the pixels to be processed, and B represents brightness differential approximations in the horizontal direction for the pixels to be processed.

In other embodiments of the present disclosure, the following equation may well be adopted for calculating gradient magnitudes of the pixels to be processed: $G(x,y)=\text{Max}[|A|,|B|]$ where Max[ ] represents a maximum operation.

Step S15, comparing the gradient magnitudes of the pixels to be processed with a gradient magnitude threshold, and selecting the pixels to be processed whose gradient magnitudes are larger than or equal to the gradient magnitude threshold as edge pixels.

Step S16, extracting a contour of a target within the image, based on the resultant edge pixels.

In the embodiment of the present disclosure, when image edge detection is carried out, disparity between grayscale values of noise pixels and background pixels can be reduced, by conducting a logarithm of grayscale values of respective pixels adjacent to the pixels to be processed. Thereby noise pixels can be removed effectively, and the problem that the conventional edge detection method is over-sensitive to non-uniform and uneven illumination can be overcome. As a result, the ability of anti-interference can be improved.

In the above embodiment, in the meantime of edge detection, a logarithm of grayscale values of respective pixels adjacent to the pixels to be processed is carried out. However, in other embodiments of the present disclosure, it is also possible to conduct a logarithm of grayscale value of each of pixels adjacent to the pixels to be processed in advance, and then edge detection may well be directly conducted on the image after a logarithm operation.

In order to further reduce adverse impact caused by noises, in embodiments of the present disclosure, prior to the image edge detection, a de-noising process may be conducted on the image.

Specifically, the image may be subject to a de-noising process by median filtering. As for the median filtering, a moving window is selected, so as to replace a pixel value for the pixel at a center of the target to be processed with median pixel value among respective pixels within the moving window. A common moving window usually includes an odd-number of pixels. For example, a 3*3-size median filtering may be adopted.

However, in other embodiments of the present disclosure, other de-noising methods may be used on the image to be processed, which will not be further elaborated herein in details.

Further, in order to facilitate to process the extracted edge and improve processing efficiency, in embodiments of the present disclosure, a binarization process may be conducted directly on pixels, while edge detection is carried out on each pixel in the image.

However, such method is unsatisfactory to regions having lower gray scale and lower illumination intensity, in terms of detection results. Accordingly, in embodiments of the present disclosure, prior to edge detection, an additional operation to increase grayscale values with respect to regions having lower gray scale and lower illumination intensity.

Specifically, in embodiments of the present disclosure, prior to edge detection, the method may further include: conducting a piecewise linear conversion and a logarithm conversion on grayscale values for respective pixels in the image sequentially, so as to obtain enhanced grayscale values for respective pixels in the image; wherein an equation for conducting the piecewise linear conversion is as follow:

$$g(x, y) = \begin{cases} F(x, y)/2 + 40, & F(x, y) \in [0, 80) \\ (F(x, y) - 64)/2 + 50, & F(x, y) \in [80, 192) \\ F(x, y)/2 + 180, & F(x, y) \in [192, 256) \end{cases}$$

and an equation for conducting the logarithm conversion is as follow:

$$g'(x,y)=\lg(g(x,y)+1)/(\lg 256)*256$$

where F(x,y) represents grayscale values for respective pixels in the image before the piecewise linear conversion, g(x,y) represents grayscale values for respective pixels after the piecewise linear conversion, and g'(x,y) represents grayscale values for respective pixels after the logarithm conversion.

Subsequent to the above gray scale enhancement, the above edge detection is carried out, followed by a filtering process (for example, median filtering) on the resultant edge pixels, so as to obtain a final contour.

Referring to FIG. 3, which is a flow chart of an image target identification method according to an embodiment of the present disclosure. The target identification method includes: an edge detection step S31, a target restoration step S32 and a target identification step S33.

Specifically, the edge detection step S31 may adopt the above edge detection methods in the above embodiments for edge detection, which will not be further elaborated herein in details.

And the target restoration step S32 may include:

Step S321, obtaining a chain code table of contour regions of a target by using a contour tracing method.

Specifically, as for the contour tracing, progressive scanning from top to bottom and from left to right respectively is conducted on the image at first, a threshold is set, and a contour tracing starting point is determined. After determining the contour tracing starting point, contour tracing is carried out according to a from-left-to-right rule, so as to obtain a chain code table of contour regions of the target.

When being implemented, a one-dimension integral array code[ ] is set for storing chain code values in the chain code table. The first two units, i.e., code[0] and code[1], are set for storing values in horizontal coordinate (X-coordinate) and vertical coordinate (Y-coordinate) of the contour tracing starting point, and the third unit, i.e., code[2], is set for storing chain codes number (a total number of the contour), and the following units starting from the fourth unit are set for storing chain codes array.

Step S322, calculating perimeters of respective regions in the image based on the chain code table.

Step S323, selecting regions whose perimeters are larger than or equal to a predetermined threshold as edges of the target in the image, and retaining the chain code table of the target.

A specific process may be as follow: expanding in terms of mathematical morphology on the image, so as to adjoin edges having small gaps therebetween; obtaining a chain code table by using contour tracing; calculating perimeters of respective regions in the image; determining regions whose perimeters are smaller than a predetermined threshold (regions having a small perimeter) as dummy targets and noises and removing such regions; retaining regions (regions with long perimeters) whose perimeters are larger than or equal to the predetermined threshold (for example, the predetermined threshold may be set to be 1000) as edges of the target.

Step S324, converting the retained chain code table into a segment table in the vertical direction.

Because the chain code table is generally used only for calculating perimeters of the target, instead of calculating areas of contour regions of the target, it is necessary to convert the chain code table into a segment table, such that the segment table is used to calculate areas of contour regions of the target.

Conventional segment table is usually in form of horizontal direction. As opposed to it, in embodiments of the present disclosure, a novel segment table has been proposed, i.e., a segment table in vertical direction. Accordingly, which parts belong to the target and which parts not are judged based on distances of these vertical segments.

Referring to Table 1, which is a conversion table from chain code table into a segment table in the vertical direction.

TABLE 1

A conversion table from the chain code table into a segment table in the vertical direction

| Type of Edge Points (Values of Bottom Right Table) | Leaving Chain Codes | | | | | | | |
|---|---|---|---|---|---|---|---|---|
| | 0 | 1 | 2 | 3 | 4 | 5 | 6 | 7 |
| Entering Chain Codes | 0 | 1 | 1 | 0 | 0 | 3 | 3 | 1 | 1 |
| | 1 | 1 | 1 | 0 | 0 | 0 | 1 | 1 | 1 |
| | 2 | 1 | 1 | 0 | 0 | 0 | 0 | 1 | 1 |
| | 3 | 3 | 3 | 2 | 2 | 2 | 2 | 0 | 3 |
| | 4 | 3 | 3 | 2 | 2 | 2 | 2 | 0 | 0 |
| | 5 | 0 | 3 | 2 | 2 | 2 | 2 | 0 | 0 |
| | 6 | 0 | 0 | 2 | 2 | 2 | 2 | 0 | 0 |
| | 7 | 1 | 1 | 0 | 3 | 3 | 3 | 1 | 1 |

In the embodiment of the present disclosure, a segment table is defined by an array including DOT structure, in which one vertical segment consists of two adjacent points, left coordinates represent upper ends, while right coordinates represent bottom ends.

Step S325, judging whether or not a distance between two ends in the segment table is smaller than or equal to a sum of distances among a predetermined number of pixels (for example, 30 pixels), and filling out a region between the two ends, when the distance between the two ends in the segment table is smaller than or equal to the sum of distances among the predetermined number of pixels, so as to obtain the restored target.

When the image involved herein is an underwater glimmer image that includes a spherical target, an ellipsoidal target, and/or a tripodal target, the target identification step S33 according to embodiments of the present disclosure may specifically include:

Step S331, calculating a shape factor of the target by $F=L^2/4\pi S$, where F represents the shape factor of the target, L represents the perimeter of contour regions of the target, S represents an area of contour regions of the target, and the area of contour regions of the target is determined based on the segment table;

Step S332, determining the target as a spherical target, in the condition that the shape factor of the target is close to 1;

Step S333, determining the target as an ellipsoidal target, in the condition that the shape factor of the target is about 1.5;

Step S334, determining the target as a tripodal target, in the condition that the shape factor of the target is larger than or equal to about 1.8.

According to the image target identification method provided by embodiments of the present disclosure, when image edge detection is carried out, disparity between grayscale values of noise pixels and background pixels can be reduced, by conducting a logarithm of grayscale values of respective pixels adjacent to the pixels to be processed. Thereby noise pixels can be removed effectively, and the problem that the conventional edge detection method is over-sensitive to non-uniform and uneven illumination can be overcome. As a result, the ability of anti-interference can be improved.

Furthermore, the above target identification method is particularly applicable to target identification in the field of underwater glimmer image, and to support for underwater robots to conduct blind processing and blind identification.

Figure 4:
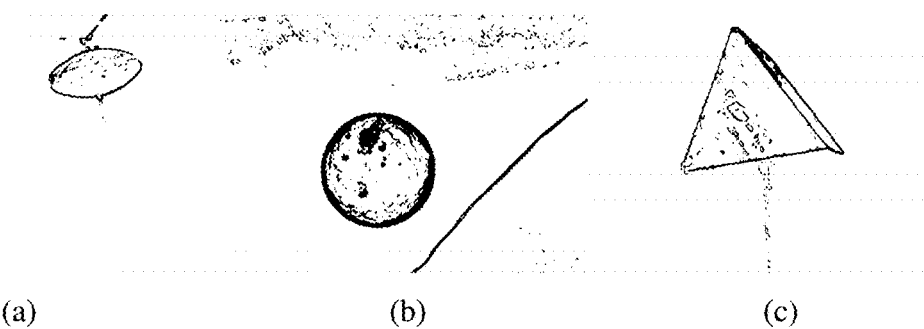
FIG. 4 is a schematic view showing results after edge detection for underwater glimmer image according to the image edge detection method based on Prewitt operators.

Next referring to FIG. 4, which is a schematic view showing results after edge detection for underwater glimmer image according to the image edge detection method based on Prewitt operators. Herein three underwater glimmer images (a), (b) and (c) indicate a spherical target, an ellipsoidal target, and a tripodal target respectively.

Figure 5:
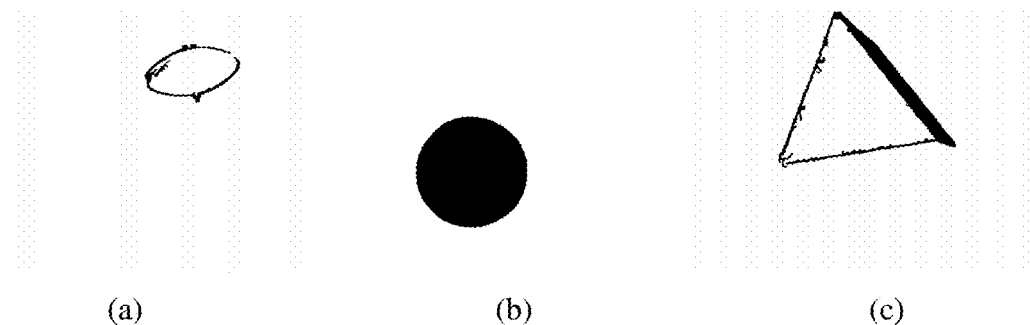
FIG. 5 is a schematic view showing results after having dummy targets and noises removed from the image shown in FIG. 4 by using perimeters of target regions.

Next referring to FIG. 5, which is a schematic view showing results after having dummy targets and noises removed from the image shown in FIG. 4 by using perimeters of target regions.

Figure 6:
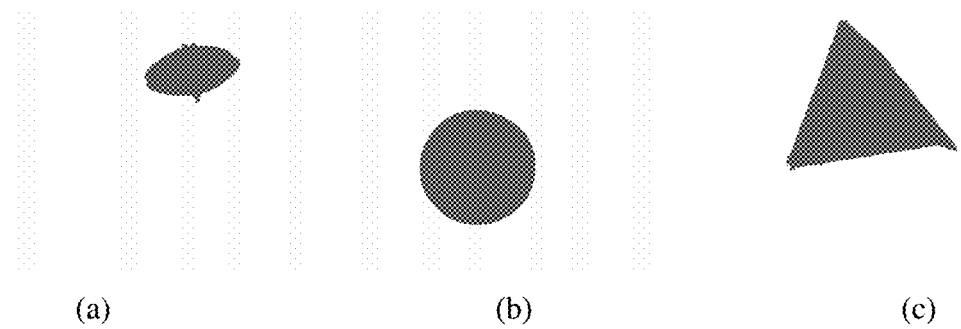
FIG. 6 is a schematic view showing results after conducting a target restoration on the image shown in FIG. 5 by using a segment table in a vertical direction.

Next referring to FIG. 6, which is a schematic view showing results after conducting a target restoration on the image shown in FIG. 5 by using a segment table in a vertical direction.

Figure 7:
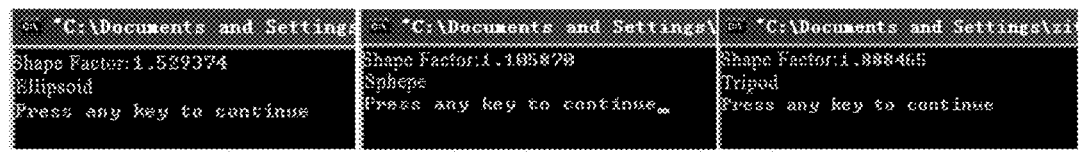
FIG. 7 shows output results of the image shown in FIG. 6 after having the target identification conducted thereon by using shape factors.

Next referring to FIG. 7, which shows output results of the image shown in FIG. 6 after having the target identification conducted thereon by using shape factors.

Figure 8:
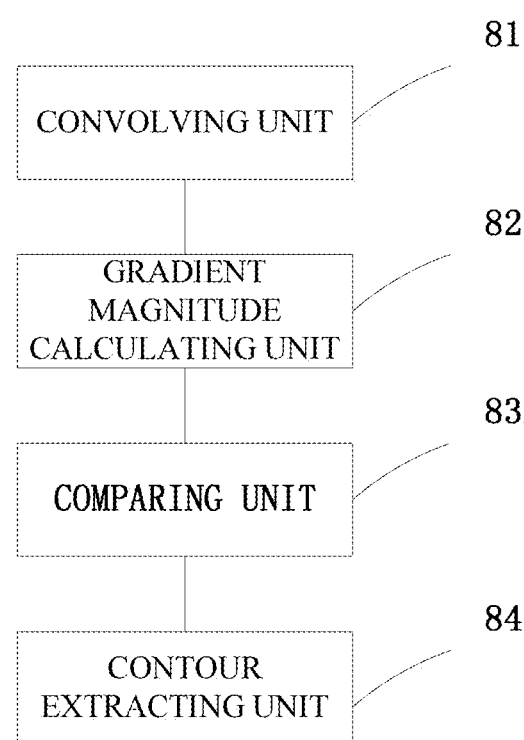
FIG. 8 is a schematic view showing a structure of an image edge detection apparatus according to an embodiment of the present disclosure.

In correspondence with the above image edge detection method, an image edge detection apparatus is also provided by an embodiment of the present disclosure. As shown in FIG. 8, the apparatus may include:

a convolving unit 81, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed;

a gradient magnitude calculating unit 82, which is configured to calculate gradient magnitudes of the pixels to be processed, based on the brightness differential approximations in all of the predetermined directions for the pixels to be processed;

a comparing unit 83, which is configured to compare the gradient magnitudes of the pixels to be processed with a gradient magnitude threshold, and select the pixels to be processed whose gradient magnitudes are larger than or equal to the gradient magnitude threshold as edge pixels; and a contour extracting unit 84, which is configured to extract a contour of a target within an image, based on the resultant edge pixels.

Alternatively, in the condition of an underwater glimmer image, the above edge detection operators may be Prewitt operators.

Alternatively, the above edge detection operators may include templates in horizontal direction and templates in vertical direction, and equations for calculating brightness differential approximations in horizontal and vertical directions for the pixels to be processed by the convolving unit are as follow:

$$A=(\log(F(x+1,y-1))+\log(F(x+1,y))+\log(F(x+1,y+1)))-(\log(F(x-1,y-1))+\log(F(x-1,y))+\log(F(x-1,y+1)))$$

$$B=(\log(F(x-1,y+1))+\log(F(x,y+1))+\log(F(x+1,y+1)))-(\log(F(x-1,y-1))+\log(F(x,y-1))+\log(F(x+1,y-1)))$$

where $F(x,y)$ represents grayscale values for respective pixels before logarithm operation, A represents brightness differential approximations in the vertical direction for the pixels to be processed, B represents brightness differential approximations in the horizontal direction for the pixels to be processed, and log( ) represents a logarithm operation.

Alternatively, an equation for calculating gradient magnitudes of the pixels to be processed by the gradient magnitude calculating unit is as follow: $G(x,y)=|A|+|B|$, where $G(x,y)$ represents gradient magnitudes of the pixels to be processed.

In correspondence with the above image target identification method, an image target identification apparatus is also provided by embodiments of the present disclosure. The apparatus may include an edge detection module, which includes:

a convolving unit, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed;

a gradient magnitude calculating unit, which is configured to calculate gradient magnitudes of the pixels to be processed, based on the brightness differential approximations in all of the predetermined directions for the pixels to be processed;

a comparing unit, which is configured to compare the gradient magnitudes of the pixels to be processed with a gradient magnitude threshold, and select the pixels to be processed whose gradient magnitudes are larger than or equal to the gradient magnitude threshold as edge pixels; and a contour extracting unit, which is configured to extract a contour of a target within an image, based on the resultant edge pixels.

Alternatively, the image target identification apparatus may further include a target restoration module, which includes:

a chain code table obtaining unit, which is configured to obtain a chain code table of contour regions of a target by using a contour tracing method;

a perimeter calculating unit, which is configured to calculate perimeters of respective regions in the image based on the chain code table;

a filtering unit, which is configured to select regions whose perimeters are larger than or equal to a predetermined threshold as edges of the target in the image, and retain the chain code table of the target;

a converting unit, which is configured to convert the retained chain code table into a segment table in the vertical direction; and a filling unit, which is configured to judge whether or not a distance between two ends in the segment table is smaller than or equal to a sum of distances among a predetermined number of pixels, and fill out a region between the two ends, when the distance between the two ends in the segment table is smaller than or equal to the sum of distances among the predetermined number of pixels, so as to obtain the restored target.

The above apparatus may further include a target identification module. When the image involved herein is an underwater glimmer image that includes a spherical target, an ellipsoidal target, or a tripodal target, the target identification module may specifically include:

a shape factor calculating unit, which is configured to calculate a shape factor of the target by $F=L^2/4\pi S$, where F represents the shape factor of the target, L represents the perimeter of contour regions of the target, S represents an area of contour regions of the target, and the area of contour regions of the target is determined based on the segment table; and a determining unit, which is configured to determine the target as a spherical target, in the condition that the shape factor of the target is close to 1; determine the target as an ellipsoidal target, in the condition that the shape factor of the target is about 1.5; and determine the target as a tripodal target, in the condition that the shape factor of the target is larger than or equal to about 1.8.

Figure 9:
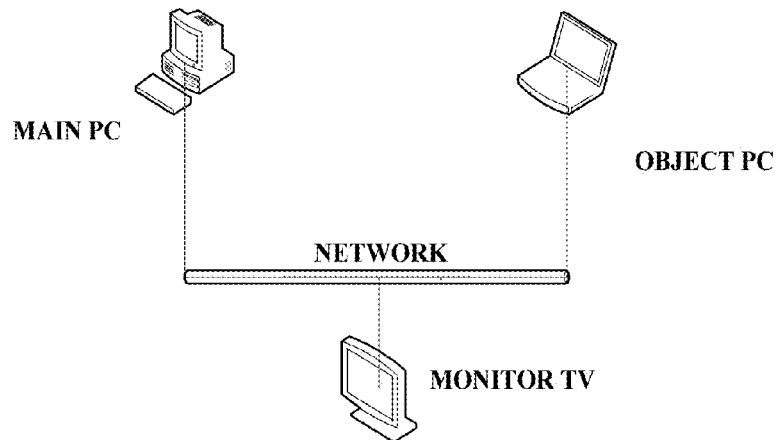
FIG. 9 is a schematic view showing a structure of an image identification system according to an embodiment of the present disclosure.

An image target identification system is also provided by embodiments of the present disclosure, as shown in FIG. 9, which includes: a main Personal Computer (PC), an object PC and a Monitor TV, which are connected via a network. This system is capable of simulating an underwater robot to conduct the target identification on glimmer images taken by using a glimmer camera.

Figure 10:
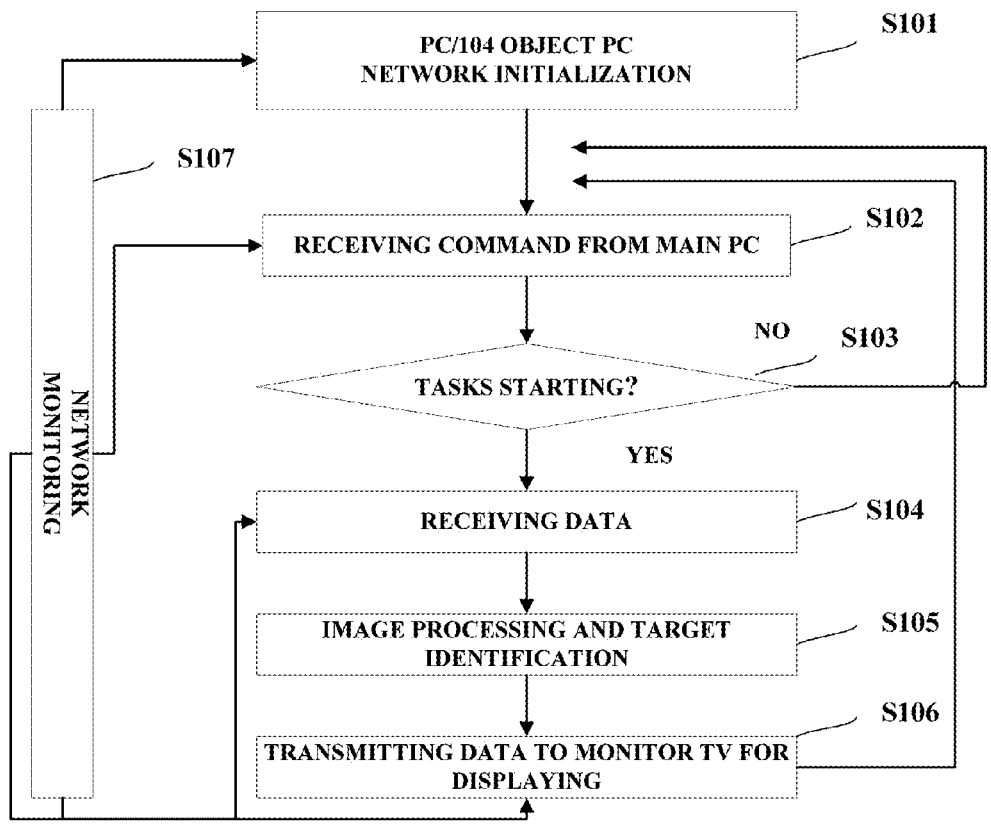
FIG. 10 is a flow chart for the image target identification system shown in FIG. 9.

Referring to FIG. 10, which a flow chart for the image target identification system shown in FIG. 9. The main procedures include:

Step S101, the object PC conducts network initialization.

Step S102, the object PC receives a command from the main PC via the network.

Step S103, the object PC judges whether or not this command is a task-starting command. If yes, proceed to Step S104; otherwise, keep waiting for the main PC to send the command.

Step S104, the object PC receives underwater glimmer image data including target information sent by the main PC.

Step S105, the object PC adopts the image target identification method in the above embodiments, conducts target identification on the glimmer image, determines a type of the target (a spherical target, an ellipsoidal target, or a tripodal target), and outputs the identification result. The result includes one of the followings, such as a spherical target, an ellipsoidal target, a tripodal target and no target.

Step S106, the object PC transmits the processed data to the monitor TV for display.

Step S107, the object PC keeps on network monitoring during the whole procedure. If a network failure has been detected, based on failure causes, returns to Step S101, S102 or S104, and transmits the monitoring result to the monitor TV for display.

Here, in order to simulate working conditions of an underwater robot precisely and achieve good real-time characteristics and reliability, in embodiments of the present disclosure, a small-size PC/104 is chosen as the processor while a VxWorks embedded operation system (OS) with a high real time characteristic is chosen as the platform of the object PC. The object PC conducts the following procedures, including: data processing on underwater glimmer images, target identification, and data processing and target identification by simulation of underwater robots.

Specifically, when the object PC is conducting data processing on certain underwater glimmer images, a median filtering pre-processing on the underwater glimmer images is conducted firstly; a contour of the target is extracted by an edge detection method based on Prewitt operators for optical density; chain code table and vertical segment table of the target is obtained by using contour tracing; further de-noising processing is conducted based on perimeters of the target; thereafter target restoration is implemented by using the vertical segment table; finally the target is identified by using shape factors. Herein the target is one of the following, such as a spherical target, an ellipsoidal target, a tripodal target and no target.

The main PC operates on the platform with VxWorks OS, which transmits a frame of underwater glimmer image data to the object PC every one second, so as to simulate underwater robots to collect data by using an underwater camera.

The monitor TV receives the processed data sent from the object PC for image display.

The underwater robots usually conduct underwater target detection, such as detecting shoal of fish, reefs and so forth. The image target identification system according to the embodiment simulates underwater robots to implement target identification by using a glimmer camera, which is significant for advancing and developing underwater detection robots and detection TVs that operate underwater.

In the following, the detailed working procedures for the main PC, the object PC and the monitor TV will be described.

Program Procedures for Object PC

The object PC is the most important part in the whole system, which simulates underwater robots to conduct data processing on underwater glimmer image data so as to identify the target, after the underwater glimmer image data have been collected.

The object PC, when operates, is to complete its initialization firstly, which is network initialization to connect the main PC and the monitor TV to the object PC. The object PC may adopt TCP protocol to implement the network connections with the main PC and the monitor TV respectively and set up two communication sockets, which may be, in implementation, implemented by two network initialization sub-functions respectively.

After initialization, the object PC waits for a command sent from the main PC. After receiving the instruction, the object PC judges whether or not the received command is to start tasks or to stop the tasks. In the condition of starting tasks, subsequent tasks are started and the receiving command is implemented by one task whose name may be a command receiving task "tMessageReceive".

When the starting command has been received, the object PC continues to receive data sent by the main PC, which is set to be a data receiving task "tDataReceive". After receiving the data, the object PC stores the received data in an array num[ ], conducts image processing, identifies shape of the target, and feeds shape information of the target and results for target identification in form of printing information. The above task is set to be a data processing task "tDataProcess". Finally the object PC transmits the processed data to the monitor TV at upstream for image displaying in the environment of VC++ via the network. The above task is set to be a data transmitting task "tDataTrans". Apart from the above, a network monitoring task "tNetCheckLink" for managing network connection/disconnection is also set up in the system.

The image processing algorithm is implemented at the object PC, namely PC/104. Regarding image processing algorithm implementation for certain underwater glimmer images, the algorithm mainly includes: a pre-processing for de-noising in advance; a contour of the target is extracted by an edge detection method based on Prewitt operators for optical density; chain code table and vertical segment table of the target are obtained by using contour tracing; further de-noising processing is conducted based on target shape characteristics; thereafter target restoration is implemented by using the vertical segment table; finally the target is identified by using shape factors. Herein the target is one of the following, such as a spherical target, an ellipsoidal target, a tripodal target and no target.

Program Procedure for Main PC

Figure 11:
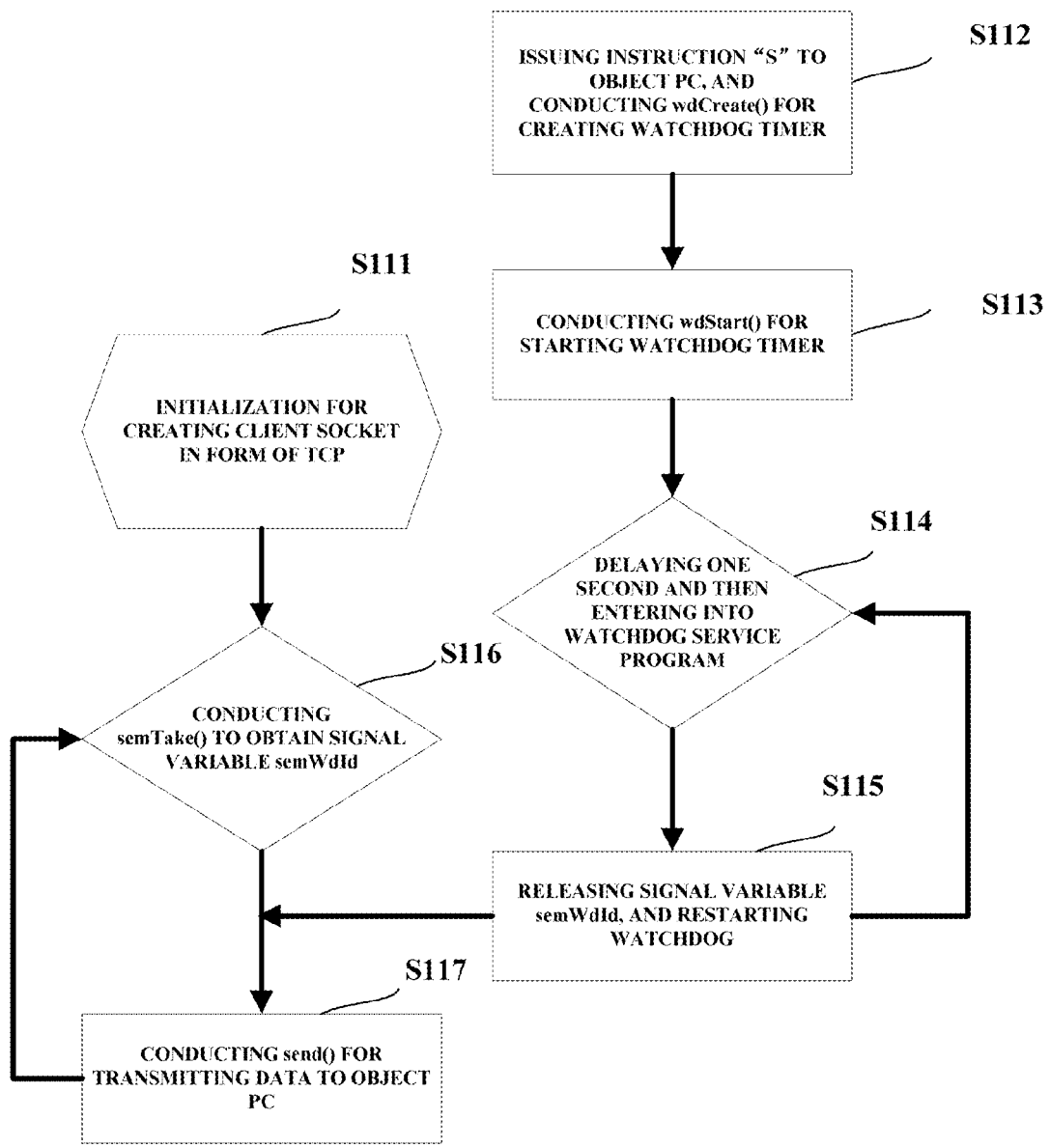
FIG. 11 is a flow chart for a main PC according to an embodiment of the present disclosure.

The main PC simulates underwater robots to collect underwater images by using a glimmer camera. Underwater glimmer image data is stored in the main PC ahead of time and the main PC transmits a frame of image data to the object PC every one second. Therefore, workload for the main PC is relatively small. Referring to FIG. 11, which is a flow chart for the main PC according to an embodiment of the present disclosure and specifically includes:

Step S111, setting up a communication socket between the main PC and the object PC by using TCP protocol, which is named as a "tTcpsocket" task;

Step S112, sending a command "S" to the object PC, and calling wdCreate( ) to create a watchdog timer;

Step S113, calling wdStart( ) to start off the watchdog timer, and set its delay parameter to be one second;

Step S114, entering into watchdog service program after one second delay, and executing a function void WDOG_ISR(void), in which the function wdStart( ) for starting off the watchdog is executed again;

Step S115, releasing a binary signal variable semWdId, and in the command transmitting task, after the function waiting for the above signal variable receives the above signal variable, the main PC transmits the command to the object PC, and starts off a task for transmitting data to the object PC; when reaching the next timing of the watchdog, the same operations will be repeated;

Step S116, obtaining signal variable semWdId by a function semTake( ); and

Step S117, transmitting the signal variable semWdId to the object PC by a function send( ).

Program Procedures of Monitor TV

The monitor TV is responsible for displaying the image of the processed image data sent by the object PC. Programming method used by the displaying includes: within the display interface, displacing static text boxes in a dialog box; associating the static text boxes with variables; creating Device Context (DC) having device and memory compatible; obtaining a location of the dialog box; obtaining the location of the dialog box; creating a bitmap associated with device context and with device compatible; displaying the image of the processed data sent by the object PC via a network by using a pasting function. In order to show a contrast between images before and after image processing to highlight processing results, two image display text boxes have been proposed, which are used to display images respectively.

In the following, the detailed operating procedures for the image target identification system according to embodiments of the present disclosure will be described, in conjunction with drawings.

In this embodiment, a task scheduling algorithm based on priority contention operating in the environment of VxWorks system has been proposed. After the completion of allocating respective tasks at the object PC, priorities for respective tasks are to be designated according to logic order for system execution. Wind kernel for VxWorks system supports 256 priorities, which are 0-255 in order. Under the scheduling based on priority contention, those tasks that should be processed relatively early are set with higher priorities, while other tasks that should be processed relatively late are set with lower priorities.

The first task taken by the object PC is system initialization, which is mainly for network initialization, and prepared for further receiving command and data and data processing tasks, whose priority is set to be 104. After the completion of system initialization, the first task to be executed is a command receiving task, for receiving a command sent by the main PC via the network, so as to determine whether or not to start a next task and enter data receiving waiting state. This task is called as "tMessageReceive" task, whose priority is set to be 105.

A data receiving task is followed by a data processing task. Therefore, priorities for the data receiving task "tDataReceive" and the data processing task "tDataProcess" are set to be 106 and 107 respectively. After the completion of data processing, the processed data is sent to the monitor TV at upstream for displaying, and this task is called as "tDataTrans". Because the execution of the task "tDataTrans" is subsequent to the execution of another task "tDataProcess", priority for the task "tDataTrans", i.e., transmitting data to the monitor TV, is set to be 109.

Priority for a network monitoring task "tNetCheckLink" is set to be 103, which is higher than any of other tasks. The network monitoring task "tNetCheckLink", the command receiving task, the data receiving task and the data transmitting task communicate with each other by using binary signal lights. When a particular one (receiving task or transmitting task) of network tasks fails and any network node drops out, such a binary signal will be released, and the network monitoring task continues to stand in a state for awaiting this binary signal. In contrast, when the network keeps to be in normal, due to the fact that the network receiving and transmitting tasks will not release signal variables, the network monitoring task cannot obtain signal variables all the time, which results in network jam. However, once network failure occurs resulting in that signal variables are received by the network monitoring task, the network monitoring task will be executed first for its higher priority, which may close down the network, delete the command receiving task, data receiving task, data processing task, data receiving task and the network monitoring task itself. Next all signal lights related with the network are deleted and the network is again initialized.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. An image edge detection method, comprising:
convolving pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed;
calculating gradient magnitudes of the pixels to be processed, based on the brightness differential approximations in the respective predetermined directions for the pixels to be processed;
comparing the gradient magnitudes of the pixels to be processed with a gradient magnitude threshold, and selecting the pixels to be processed whose gradient magnitudes are larger than or equal to the gradient magnitude threshold as edge pixels; and
extracting a contour of a target within an image, based on the resultant edge pixels.

2. The method according to claim 1, wherein the edge detection operators are Prewitt operators.

3. The method according to claim 2, wherein the templates in respective predetermined directions for edge detection operators comprise templates in a horizontal direction and templates in a vertical direction, and equations for calculating brightness differential approximations in the horizontal and vertical directions for the pixels to be processed are as follow:

$$A=(\log(F(x+1,y-1))+\log(F(x+1,y))+\log(F(x+1,y+1)))-(\log(F(x-1,y-1))+\log(F(x-1,y))+\log(F(x-1,y+1)))$$

$$B=(\log(F(x-1,y+1))+\log(F(x,y+1))+\log(F(x+1,y+1)))-(\log(F(x-1,y-1))+\log(F(x,y-1))+\log(F(x+1,y-1)))$$

where F(x, y) represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

4. The method according to claim 3, wherein an equation for calculating gradient magnitudes of the pixels to be processed is as follow:

$$G(x,y)=|A|+|B|$$

where G(x, y) represents gradient magnitudes of the pixels to be processed.

5. The method according to claim 1, wherein before the convolving step, the method further comprises:
conducting a piecewise linear conversion and a logarithm conversion on grayscale values for respective pixels in the image sequentially, so as to obtain enhanced grayscale values for respective pixels in the image;
wherein an equation for conducting the piecewise linear conversion is as follow:

$$g(x, y) = \begin{cases} F(x, y)/2 + 40, & F(x, y) \in [0, 80) \\ (F(x, y) - 64)/2 + 50, & F(x, y) \in [80, 192) \\ F(x, y)/2 + 180, & F(x, y) \in [192, 256) \end{cases}$$

and an equation for conducting the logarithm conversion is as follow:

$$g'(x,y)=\lg(g(x,y)+1)/(\lg 256)*256$$

where F(x, y) represents grayscale values for respective pixels in the image before the piecewise linear conversion, g(x, y) represents grayscale values for respective pixels in the image after the piecewise linear conversion, and g'(x,y) represents grayscale values for respective pixels in the image after the logarithm conversion.

6. An image target identification method, comprising:
an image edge detection step, which is implemented by the image edge detection method according to claim 1.

7. The method according to claim 6, further comprising:
a target restoration step, which comprises:
obtaining a chain code table of contour regions of a target by using a contour tracing method;
calculating perimeters of respective regions in the image based on the chain code table;
selecting regions whose perimeters are larger than or equal to a predetermined threshold as edges of the target in the image, and retaining the chain code table of the target;
converting the retained chain code table into a segment table in the vertical direction; and
judging whether or not a distance between two ends in the segment table is smaller than or equal to a sum of distances among a predetermined number of pixels, and filling out a region between the two ends, when the distance between the two ends in the segment table is smaller than or equal to the sum of distances among the predetermined number of pixels, so as to obtain the restored target.

8. The method according to claim 7, wherein when the image is an underwater glimmer image, the method further comprises a target identification step, which comprises:
calculating a shape factor of the target by $F=L^2/4\pi S$ where F represents the shape factor of the target, L represents the perimeter of contour regions of the target, S represents an area of contour regions of the target, and the area of contour regions of the target is calculated based on the segment table;
determining the target as a spherical target, in the condition that the shape factor of the target is close to 1;
determining the target as an ellipsoidal target, in the condition that the shape factor of the target is about 1.5; and
determining the target as a tripodal target, in the condition that the shape factor of the target is larger than or equal to about 1.8.

9. The method according to claim 6, wherein the edge detection operators are Prewitt operators.

10. The method according to claim 9, wherein the templates in respective predetermined directions for edge detection operators comprise templates in a horizontal direction and templates in a vertical direction, and equations for calculating brightness differential approximations in the horizontal and vertical directions for the pixels to be processed are as follow:

$$A=(\log(F(x+1,y-1))+\log(F(x+1,y))+\log(F(x+1,y+1)))-(\log(F(x-1,y-1))+\log(F(x-1,y))+\log(F(x-1,y+1)))$$

$$B=(\log(F(x-1,y+1))+\log(F(x,y+1))+\log(F(x+1,y+1)))-(\log(F(x-1,y-1))+\log(F(x,y-1))+\log(F(x+1,y-1)))$$

where F(x, y) represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

11. The method according to claim 10, wherein an equation for calculating gradient magnitudes of the pixels to be processed is as follows:

$$G(x,y)=|A|+|B|$$

where G(x, y) represents gradient magnitudes of the pixels to be processed.

12. The method according to claim 6, wherein before the convolving step, the method further comprises:
conducting a piecewise linear conversion and a logarithm conversion on grayscale values for respective pixels in the image sequentially, so as to obtain enhanced grayscale values for respective pixels in the image;
wherein an equation for conducting the piecewise linear conversion is as follow:

$$g(x, y) = \begin{cases} F(x, y)/2 + 40, & F(x, y) \in [0, 80) \\ (F(x, y) - 64)/2 + 50, & F(x, y) \in [80,192) \\ F(x, y)/2 + 180, & F(x, y) \in [192, 256) \end{cases}$$

and an equation for conducting the logarithm conversion is as follow:

$$g'(x,y)=\lg(g(x,y)+1)/(\lg 256)*256$$

where F(x, y) represents grayscale values for respective pixels in the image before the piecewise linear conversion, g(x, y) represents grayscale values for respective pixels in the image after the piecewise linear conversion, and g'(x, y) represents grayscale values for respective pixels in the image after the logarithm conversion.

13. An image edge detection apparatus, comprising:
  a convolving unit, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed;
  a gradient magnitude calculating unit, which is configured to calculate gradient magnitudes of the pixels to be processed, based on the brightness differential approximations in the respective predetermined directions for the pixels to be processed;
  a comparing unit, which is configured to compare the gradient magnitudes of the pixels to be processed with a gradient magnitude threshold, and select the pixels to be processed whose gradient magnitudes are larger than or equal to the gradient magnitude threshold as edge pixels; and
  a contour extracting unit, which is configured to extract a contour of a target within an image, based on the resultant edge pixels.

14. The apparatus according to claim 13, wherein the edge detection operators are Prewitt operators.

15. The apparatus according to claim 14, wherein the templates in respective predetermined directions for edge detection operators comprise templates in a horizontal direction and templates in a vertical direction, and equations for calculating brightness differential approximations in the horizontal and vertical directions for the pixels to be processed by the convolving unit are as follow:

$$A=(\log(F(x+1,y-1))+\log(F(x+1,y))+\log(F(x+1,y+1)))-(\log(F(x-1,y-1))+\log(F(x-1,y))+\log(F(x-1,y+1)))$$

$$B=(\log(F(x-1,y+1))+\log(F(x,y+1))+\log(F(x+1,y+1)))-(\log(F(x-1,y-1))+\log(F(x,y-1))+\log(F(x+1,y-1)))$$

where F(x, y) represents grayscale values for respective pixels adjacent to the pixels to be processed before logarithm operation, A represents brightness differential approximations in the vertical direction for the pixels to be processed, B represents brightness differential approximations in the horizontal direction for the pixels to be processed, and log( ) represents a logarithm operation.

16. The apparatus according to claim 15, wherein an equation for calculating gradient magnitudes of the pixels to be processed by the gradient magnitude calculating unit is as follow:

$$G(x,y)=|A|+|B|$$

where G(x, y) represents gradient magnitudes of the pixels to be processed.

17. The apparatus according to claim 13, further comprising:
  a unit, which is configured to conduct a piecewise linear conversion and a logarithm conversion on grayscale values for respective pixels in the image sequentially, so as to obtain enhanced grayscale values for respective pixels in the image;
  wherein an equation for conducting the piecewise linear conversion is as follow:

$$g(x, y) = \begin{cases} F(x, y)/2 + 40, & F(x, y) \in [0, 80) \\ (F(x, y) - 64)/2 + 50, & F(x, y) \in [80, 192) \\ F(x, y)/2 + 180, & F(x, y) \in [192, 256) \end{cases}$$

and an equation for conducting the logarithm conversion is as follow:

$$g'(x,y)=\lg(g(x,y)+1)/(\lg 256)*256$$

where F(x, y) represents grayscale values for respective pixels in the image before the piecewise linear conversion, g(x, y) represents grayscale values for respective pixels in the image after the piecewise linear conversion, and g'(x, y) represents grayscale values for respective pixels in the image after the logarithm conversion.

18. An image target identification apparatus, comprising:
  an edge detection module, which comprises:
    a convolving unit, which is configured to convolve pixels to be processed, based on templates in respective predetermined directions for edge detection operators and a logarithm of grayscale values for respective pixels adjacent to the pixels to be processed, so as to obtain brightness differential approximations in the respective predetermined directions for the pixels to be processed;
    a gradient magnitude calculating unit, which is configured to calculate gradient magnitudes of the pixels to be processed, based on the brightness differential approximations in the respective predetermined directions for the pixels to be processed;
    a comparing unit, which is configured to compare the gradient magnitudes of the pixels to be processed with a gradient magnitude threshold, and select the pixels to be processed whose gradient magnitudes are larger than or equal to the gradient magnitude threshold as edge pixels; and
    a contour extracting unit, which is configured to extract a contour of a target within an image, based on the resultant edge pixels.

19. The apparatus according to claim 18, further comprising:
  a target restoration module, which comprises:
    a chain code table obtaining unit, which is configured to obtain a chain code table of contour regions of a target by using a contour tracing method;
    a perimeter calculating unit, which is configured to calculate perimeters of respective regions in the image based on the chain code table;
    a filtering unit, which is configured to select regions whose perimeters are larger than or equal to a predetermined threshold as edges of the target in the image, and retain the chain code table of the target;
    a converting unit, which is configured to convert the retained chain code table into a segment table in the vertical direction; and
    a filling unit, which is configured to judge whether or not a distance between two ends in the segment table is smaller than or equal to a sum of distances among a predetermined number of pixels, and fill out a region between the two ends, when the distance between the two ends in the segment table is smaller than or equal to the sum of distances among the predetermined number of pixels, so as to obtain the restored target.

20. The apparatus according to claim 18, wherein the apparatus further comprises a target identification module, which comprises:

a shape factor calculating unit, which is configured to calculate a shape factor of the target by $F=L^2/4\pi S$, where F represents the shape factor of the target, L represents the perimeter of contour regions of the target, S represents an area of contour regions of the target, and the area of contour regions of the target is calculated based on the segment table; and a determining unit, which is configured to determine the target as a spherical target, in the condition that the shape factor of the target is close to 1; determine the target as an ellipsoidal target, in the condition that the shape factor of the target is about 1.5; and determine the target as a tripodal target, in the condition that the shape factor of the target is larger than or equal to about 1.8.

\* \* \* \* \*